US008059242B2

(12) United States Patent     (10) Patent No.: US 8,059,242 B2
Onogi et al.     (45) Date of Patent: Nov. 15, 2011

(54) LIQUID CRYSTAL DISPLAY DEVICE

(75) Inventors: Tomohide Onogi, Gifu (JP); Yasuo Segawa, Gifu (JP)

(73) Assignee: Sony Corporation, Tokyo (JP)

( * ) Notice: Subject to any disclaimer, the term of this patent is extended or adjusted under 35 U.S.C. 154(b) by 1303 days.

(21) Appl. No.: 11/708,681

(22) Filed: Feb. 21, 2007

(65) Prior Publication Data

US 2007/0195250 A1    Aug. 23, 2007

(30) Foreign Application Priority Data

Feb. 22, 2006  (JP) ................................. 2006-044623
Aug. 8, 2006   (JP) ................................. 2006-215268

(51) Int. Cl.
  *G02F 1/1337* (2006.01)
  *G02F 1/1343* (2006.01)
(52) U.S. Cl. ........................ 349/129; 349/130; 349/139
(58) Field of Classification Search .................. 349/129, 349/130, 139
  See application file for complete search history.

(56) References Cited

U.S. PATENT DOCUMENTS

| 6,031,592 | A  | * | 2/2000  | Shibahara ...................... 349/113 |
| 6,628,357 | B1 | * | 9/2003  | Maeda et al. .................. 349/113 |
| 6,710,835 | B2 |   | 3/2004  | Kurahashi et al. |
| 6,721,027 | B2 |   | 4/2004  | Chuang |
| 2001/0005251 | A1 | | 6/2001  | Kim et al. |
| 2001/0046027 | A1 | | 11/2001 | Tai et al. |
| 2005/0046775 | A1 | | 3/2005  | Lee et al. |

FOREIGN PATENT DOCUMENTS

| JP | 2001-83540    |   | 3/2001 |
| JP | 2002-221736   | A | 8/2002 |
| JP | 2002-229066   |   | 8/2002 |
| JP | 2002-296611   |   | 10/2002 |
| JP | 2003-322869   | A | 11/2003 |
| JP | 2005-070747   |   | 3/2005 |
| KR | 2001-0063288  |   | 7/2001 |
| KR | 10-2006-0027623 |   | 3/2006 |

* cited by examiner

*Primary Examiner* — David Nelms
*Assistant Examiner* — David Chung
(74) *Attorney, Agent, or Firm* — K&L Gates LLP

(57) ABSTRACT

Transmittance and contrast of a liquid crystal display device according to FFS method are improved. A plurality of picture elements, each made of an R pixel, a G pixel and a B pixel, is disposed in a matrix form. In each of the pixels, a gate signal line extends in a left to right direction and a display signal line extends in a top to bottom direction so as to cross the gate line. A thin film transistor for pixel selection is disposed around an intersection of the gate line and the display signal line. There is provided a pixel electrode connected with the thin film transistor. A common electrode is provided on the pixel electrode through an insulation film. A plurality of slits having edges at borders between the picture elements is disposed in the common electrode to cross each of the picture elements in the left to right direction.

2 Claims, 12 Drawing Sheets

LIQUID CRYSTAL DISPLAY DEVICE

CROSS-REFERENCE OF THE INVENTION

This application claims priority from Japanese Patent Application Nos. 2006-215268 and 2006-044623, the content of which is incorporated herein by reference in its entirety

BACKGROUND OF THE INVENTION

1. Field of the Invention

This invention relates to a liquid crystal display device, specifically to a liquid crystal display device in which an alignment direction of liquid crystal molecules is controlled by a lateral electric field between electrodes on the same substrate.

2. Description of the Related Art

As a way to achieve a wide viewing angle of the liquid crystal display device, a method has been developed to realize a light switching function by rotating the liquid crystal molecules in a plane parallel to the substrate with a lateral electric field generated between the electrodes on the same substrate. In-Plane Switching (hereafter referred to as IPS) method and Fringe-Field Switching (hereafter referred to as FFS) method are known as examples of these technologies.

Next, the liquid crystal display device according to the FFS method is explained referring to the drawings. FIG. 12 is a plan view showing the liquid crystal display device according to the FFS method. FIG. 13 is a cross-sectional view of a section Y-Y in FIG. 12. Although a plurality of pixels is disposed in a matrix form in the actual liquid crystal display device, only one pixel is shown in these figures.

A TFT substrate made of a glass substrate or the like faces a light source BL. A first polarizing plate 11 that linearly polarizes light from the light source BL is formed on a surface of a side of the TFT substrate 10 facing the light source BL. A buffer film 12 made of a silicon dioxide film, a silicon nitride film or the like is formed on a surface of the opposite side of the TFT substrate 10.

An active layer PS made of polysilicon or the like is formed on the buffer film 12 in an area where a thin film transistor TR for pixel selection is to be formed. A gate insulation film 13, that is made of a silicon dioxide film, a silicon nitride film or the like and covers the active layer PS, is formed on the buffer film 12. A gate line GL is formed on the gate insulation film 13 so as to face the active layer PS. The gate line GL is made of a metal including chromium or molybdenum or the like. A common electric potential line COM, that is made of a metal including chromium or molybdenum or the like and provides a common electric potential, is formed on the gate insulation film 13. The gate line GL, the common electric potential line COM and the gate insulation film 13 are covered by an interlayer insulation film 14.

The interlayer insulation film 14 is provided with a contact hole CH1, that exposes a source region in the active layer PS, and a contact hole CH2, that exposes a drain region in the active layer PS. The interlayer insulation film 14 is also provided with a contact hole CH3 that exposes the common electric potential line COM.

A display signal line DL, that is connected with the source region in the active layer PS through the contact hole CH1, is formed on a surface of the interlayer insulation film 14. A drain electrode 15, that is connected with the drain region in the active layer PS through the contact hole CH2, is formed on the surface of the interlayer insulation film 14. Also, a pad electrode 16, that is connected with the common electric potential line COM through the contact hole CH3, is formed on the surface of the interlayer insulation film 14. The display signal line DL, the drain electrode 15 and the pad electrode 16 are made of a metal including aluminum or aluminum alloy or the like. The display signal line DL, the drain electrode 15, the pad electrode 16 and the interlayer insulation film 14 are covered by a passivation film 58.

A planarization film 59 is formed on the passivation film 58. The passivation film 58 and the planarization film 59 are provided with a contact hole CH5, that exposes the drain electrode 15, and a contact hole CH6, that exposes the pad electrode 16.

A pixel electrode 60, that is made of a first layer transparent electrode such as ITO (Indium Tin Oxide) and is connected with the drain electrode 15 through the contact hole CH5, is formed on the planarization film 59. A display voltage corresponding to a display signal is applied to the pixel electrode 60. An insulation film 61 is formed on the pixel electrode 60 to cover it. A common electrode 62, that is made of a second layer transparent electrode such as ITO and has a plurality of slits S extending parallel to each other, is formed on the insulation film 61. The common electrode 62 is connected with the pad electrode 16 through the contact hole CH6. An alignment film (not shown) covering the common electrodes 62 is formed over the insulation film 61.

A color filter substrate (hereafter referred to as CF substrate) 20 made of a glass substrate or the like faces the TFT substrate 10. A color filter and an alignment film (not shown) are formed on a surface of a side of the CF substrate 20, which is facing the TFT substrate 10. A second polarizing plate 21 is formed on a surface of another side of the CF substrate 20, which is not facing the TFT substrate 10. The first and second polarizing plates 11 and 21 are positioned so that their polarization axes are perpendicular to each other. A liquid crystal 30 is sealed between the TFT substrate 10 and the CF substrate 20.

In the liquid crystal display device described above, an average alignment direction (hereafter simply referred to as "alignment direction") of major axes of the liquid crystal molecules of the liquid crystal 30 is parallel to the polarization axis of the first polarizing plate 11 when the display voltage is not applied to the pixel electrode 60 (no voltage state). In this case, the linearly polarized light passing through the liquid crystal 30 does not go through the second polarizing plate 21 because its polarization axis is perpendicular to the polarization axis of the second polarizing plate 21. That is, black is displayed (normally black).

When the display voltage is applied to the pixel electrode 60, on the other hand, there are caused electric fields from the common electrode 62 toward the underlying pixel electrode 60 through the slits S. (Refer to arrows in FIG. 13.) The electric fields are perpendicular to a longitudinal direction of the slits S on the two-dimensional view, and the liquid crystal molecules rotate along lines of electric force of the electric fields. (Refer to arrows in FIG. 12.) At that time, the linearly polarized incident light to the liquid crystal 30 is turned into elliptically polarized light by birefringence to have a component of linearly polarized light that passes through the second polarizing plate 21. In this case, white is displayed. The liquid crystal display device according to the FFS method is disclosed in Japanese Patent Application Publication No. 2002-296611, for example.

When the display voltage is applied to the pixel electrode 60, while the lines of electric force perpendicular to the longitudinal direction of the slits S are caused at central regions SC of the slits S shown in FIG. 12 as described above, the lines of electric force of different directions are caused at edges SE of the slits S. The alignment direction of the liquid crystal molecules is different from that in the central region SC of the slits. Portions of the liquid crystal of the different alignment direction make domains (portions indicated by circles in FIG. 12). Such a fault in alignment of the liquid crystal molecules is called disclination. Due to the disclination, there has been a problem of degradation in optical characteristics, that is, localized reduction in transmittance and contrast in the normally black.

SUMMARY OF THE INVENTION

This invention offers a liquid crystal display device having a plurality of pixels, each of the pixels being provided with a thin film transistor, a pixel electrode connected with the thin film transistor, and a common electrode disposed on the pixel electrode through an insulation film and provided with a common electric potential, wherein the common electrode has at lease one slit that extends across the plurality of pixels.

DETAILED DESCRIPTION OF THE INVENTION

Figure 1:
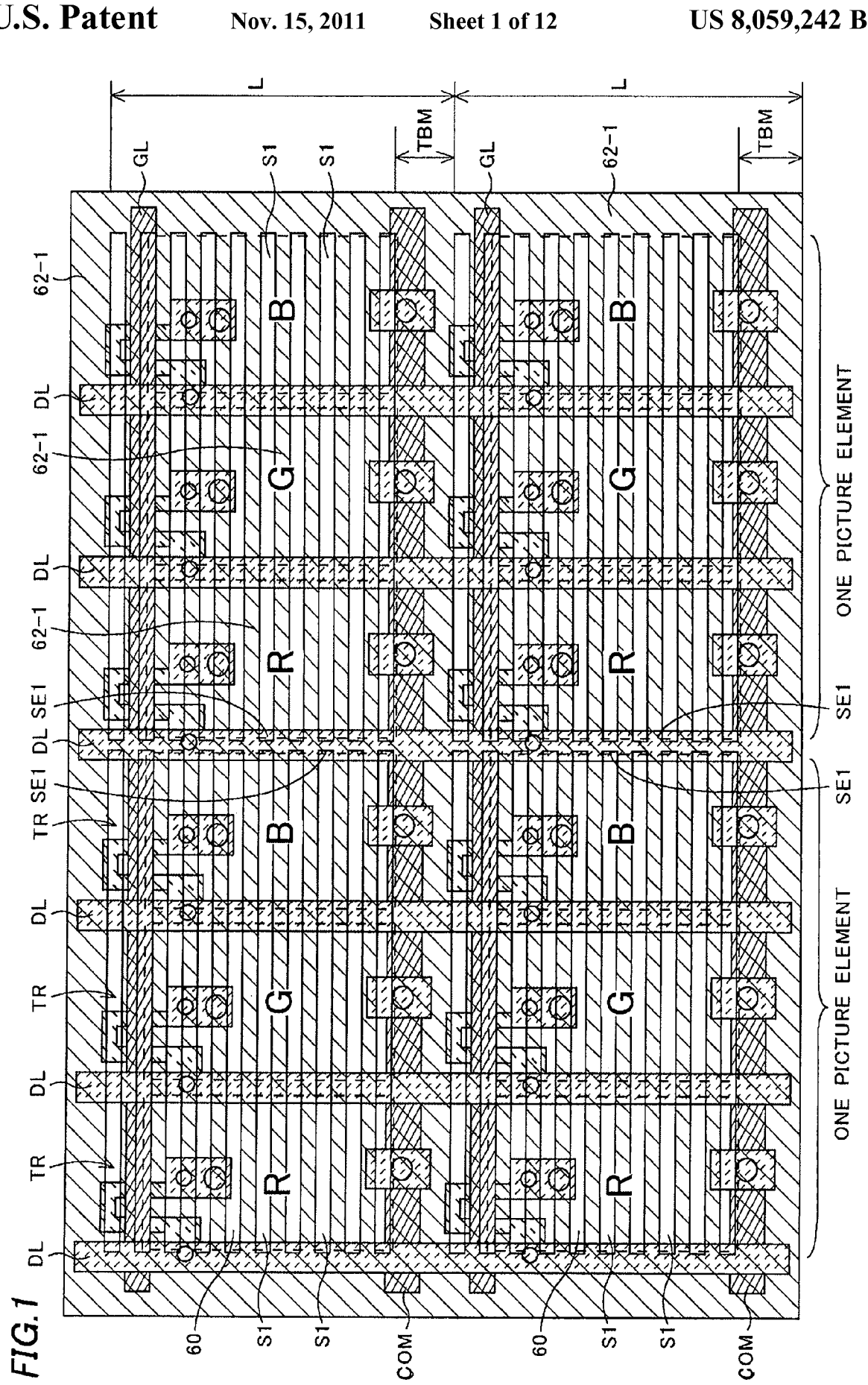
FIG. 1 shows a layout of pixels in a liquid crystal display device according to a first embodiment of this invention.
Figure 12:
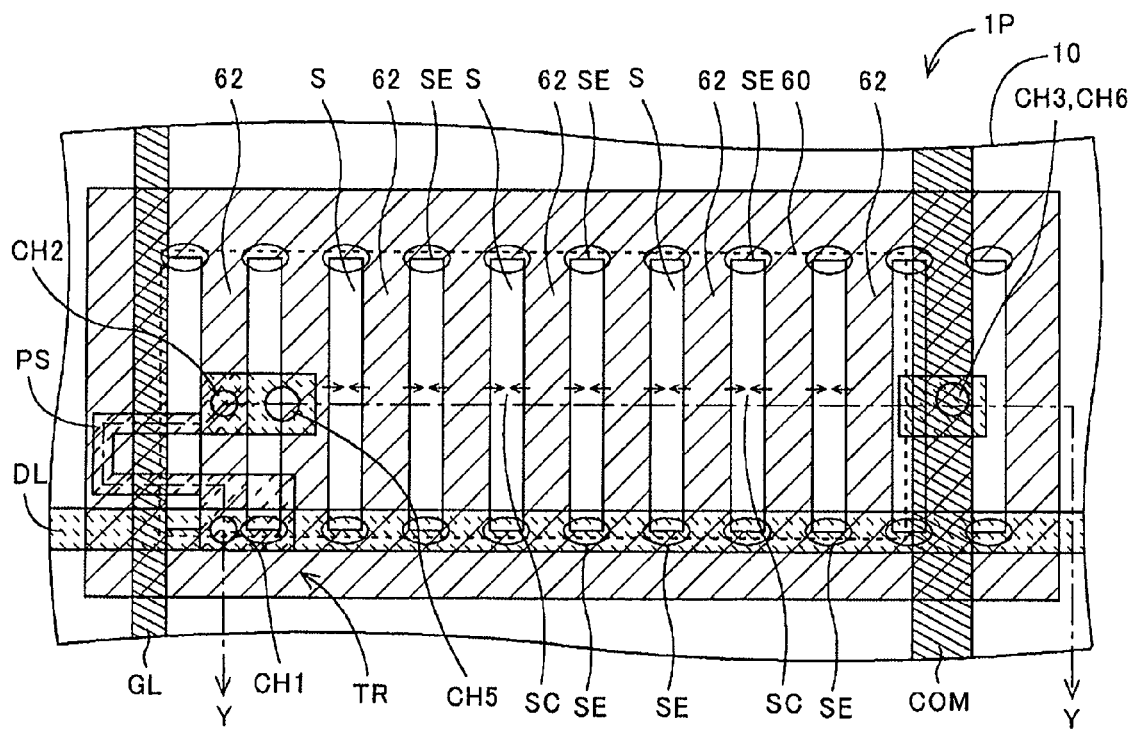
FIG. 12 is a plan view showing a liquid crystal display device according to a conventional art.

A liquid crystal display device according to a first embodiment of this invention will be described referring to FIG. 1. The same components in FIG. 1 as in FIG. 12 are denoted by the same symbols. Three pixels, each of which corresponds to each of red, green and blue (hereafter referred to as an R pixel, a G pixel and a B pixel, respectively), make one picture element, and a plurality of picture elements is disposed on a TFT substrate in a matrix form. In each of the R pixel, G pixel and B pixel, a gate line GL extends in a left to right direction (horizontal direction), while a display signal line DL extends in a top to bottom direction (vertical direction). A thin film transistor TR is disposed around an intersection of the gate line GL and the display signal line DL. There is provided a pixel electrode 60 connected with the thin film transistor TR for pixel selection. A common electrode 62-1 is provided on the pixel electrode 60 through an insulation film. The common electrode 62-1 is connected with a common electric potential line COM that extends in the left to right direction.

The common electrode 62-1 extends straight in the left to right direction, i.e. the direction perpendicular to the display signal line DL, to cross the picture element. In the common electrode 62-1, there is provided a plurality of slits S1 having edges SE1 at borders between neighboring picture elements. Note that the slit S1 is not necessarily oriented exactly perpendicular to the display signal line DL. It may be oriented approximately perpendicular and may be tilted about 5 degrees relative to the left to right direction (horizontal direction), for example.

The number of the edges SE1 of the slits S1 in the display device is reduced in this embodiment because all the slits S1 pierce through the three pixels R, G and B of a corresponding picture element, unlike the conventional structure shown in FIG. 12. The reduction in transmittance and contrast due to the disclination can be suppressed by these long slits S1. Particularly by placing the G pixel, which has major effect on the contrast, in the middle of the picture element, the transmittance and the contrast can be maximized because there is no edge SE1 of the slit S1 in the G pixel. The liquid crystal is sealed between the TFT substrate and a CF substrate as in the conventional art.

Figure 2:
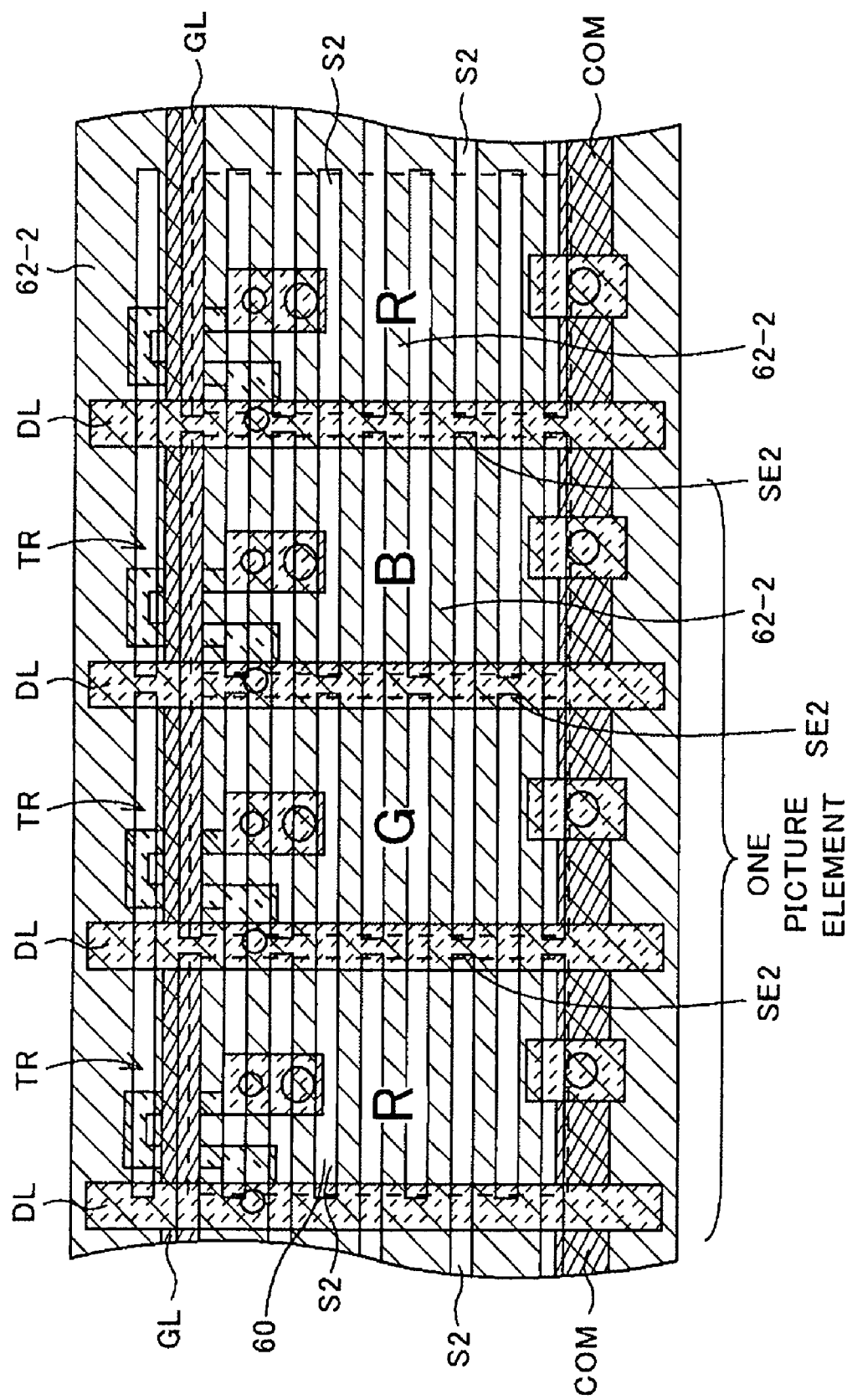
FIG. 2 shows a layout of pixels in a liquid crystal display device according to a second embodiment of this invention.

Next, a second embodiment of this invention will be described referring to FIG. 2. The same components in FIG. 2 as in FIG. 12 are denoted by the same symbols. In this embodiment also, there is disposed in a matrix form a plurality of picture elements, each of which is made of an R pixel, a G pixel and a B pixel. Only four pixels are shown in FIG. 2.

The second embodiment is different from the first embodiment in that a common electrode 62-2 is provided with a plurality of slits S2 extending to cover a width of two pixels (a width of two pixels in horizontal direction, in other words, the width in the left to right direction) in the left to right direction and that the slits S2 are arranged in a staggered manner. That is, a slit S2 in a second row, that is immediately below a first row, is shifted in the left to right direction by the width of one pixel from the slit S2 in the first row. And a slit S2 in a third row, that is further below, is shifted in the left to right direction by the width of one pixel from the slit S2 in the second row. As a result, the slits S2 have the same horizontal arrangement in every other row.

By doing so, the number of edges SE2 of the slits S2 per pixel is reduced to a half of that in the conventional art shown in FIG. 12. Increased transmittance and improved contrast can be realized by reducing the number of edges SE2 of the slits S2.

Figure 3:
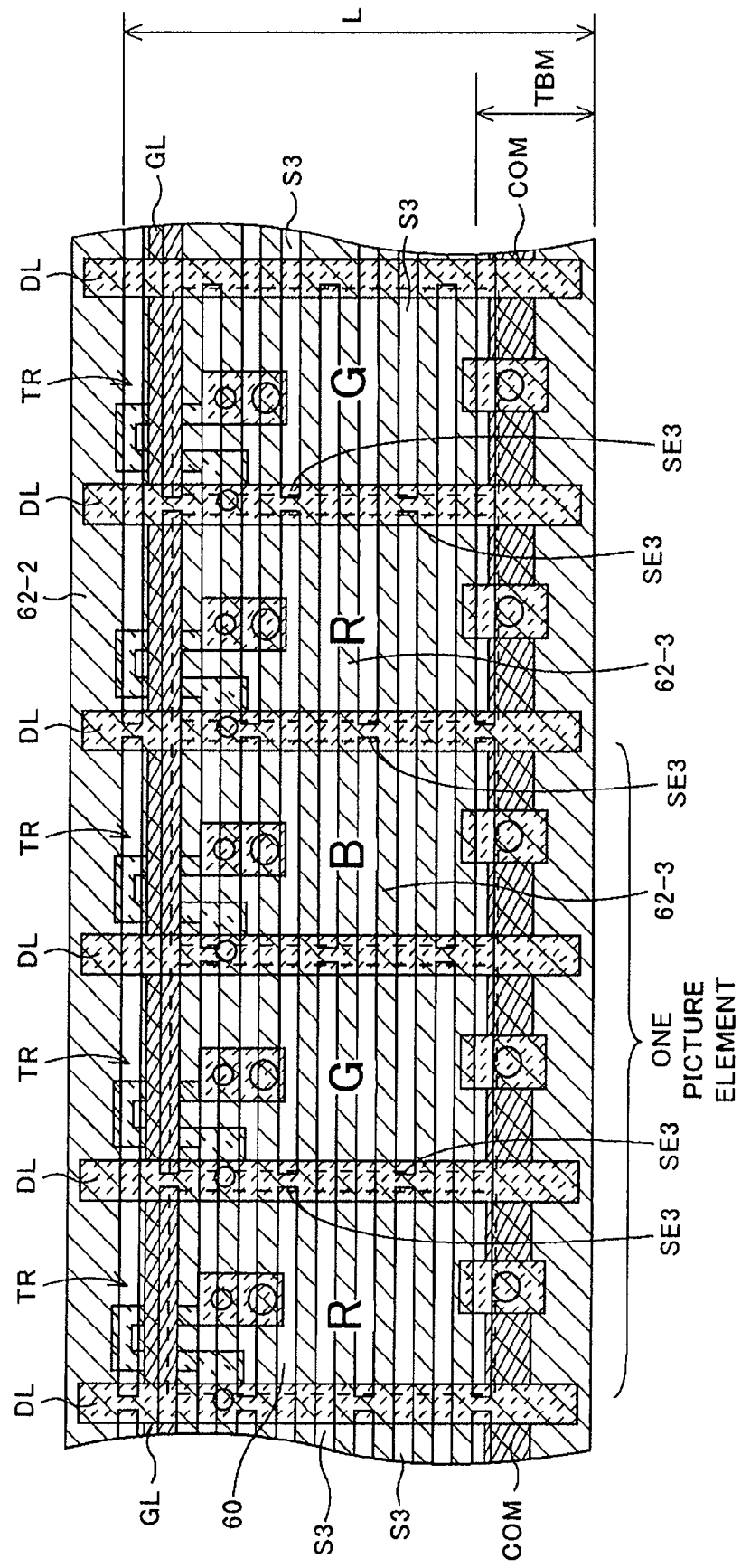
FIG. 3 shows a layout of pixels in a liquid crystal display device according to a third embodiment of this invention.

Next, a third embodiment of this invention will be described referring to FIG. 3. The same components in FIG. 3 as in FIG. 12 are denoted by the same symbols. In this embodiment also, there is disposed in a matrix form a plurality of picture elements, each of which is made of an R pixel, a G pixel and a B pixel. Only five pixels are shown in FIG. 3.

The third embodiment is different from the first embodiment in that a common electrode 62-3 is provided with a plurality of slits S3 extending to cover a width of three pixels in the left to right direction. Again, the slits S3 are arranged in a staggered manner. That is, a slit S3 in a second row, that is immediately below a first row, is shifted to right by the width of one pixel from a slit S3 in the first row. And a slit S3 in a third row, that is further below, is shifted to right by the width of one pixel from the slit S3 in the second row. And a slit S3 in a fourth row, that is even further below, is shifted to right by the width of one pixel from the slit S3 in the third row, resulting in that the fourth slit S3 is disposed in the same horizontal position as the slit S3 in the first row. As a result, the slits S3 have the same horizontal arrangement in every three rows.

By doing so, the number of edges SE3 of the slits S3 per pixel is reduced to a third of that in the conventional art shown in FIG. 12. Increased transmittance and improved contrast can be realized by reducing the number of edges SE3 of the slits S3.

The number of edges of slits per pixel can be further reduced by further extending the length of each of the slits in the common electrode to a width of four pixels or more than four pixels, in the same manner as in the second and third embodiments. As the slits extend further, however, the stripe-shaped common electrode in the pixels also extends in the left to right direction and its resistance increases. As a result, a distortion in the electric potential at the common electrode is caused during operation, leading to reduced display quality due to crosstalk or the like. Therefore, it is preferable that the length of the slits is suppressed to a length that does not cause a problem such as the crosstalk or the like.

For that purpose, the number of edges per pixel is made to be the same in all pixels. The limit of the length of such slits is defined as a width of the pixel multiplied by N. This value "N" is the maximum natural number of X that satisfies the following equation:

$$L-TBM \geqq (1+s) \times X$$

where L is a vertical pitch (μm) of the pixels, TBM is a vertical width (μm) of a black matrix, 1 is a width (μm) of the slit and s is a width (μm) of a spacing between the slits.

When L=150 μm, TBM=20 μm and (1+s)=6.5 μm, for example, the equation gives X≦20, thereby the number N is 20. In the case described above, each of the slits extends in the left to right direction 20 times of the width of the pixel and the slits are disposed in the top to bottom direction in a way that a slit in a row immediately below is shifted by a width of one pixel from the slits in a row immediately above. Therefore, the number of edges in each pixel becomes one, making the number of edges in all the pixels uniform.

Figure 4:
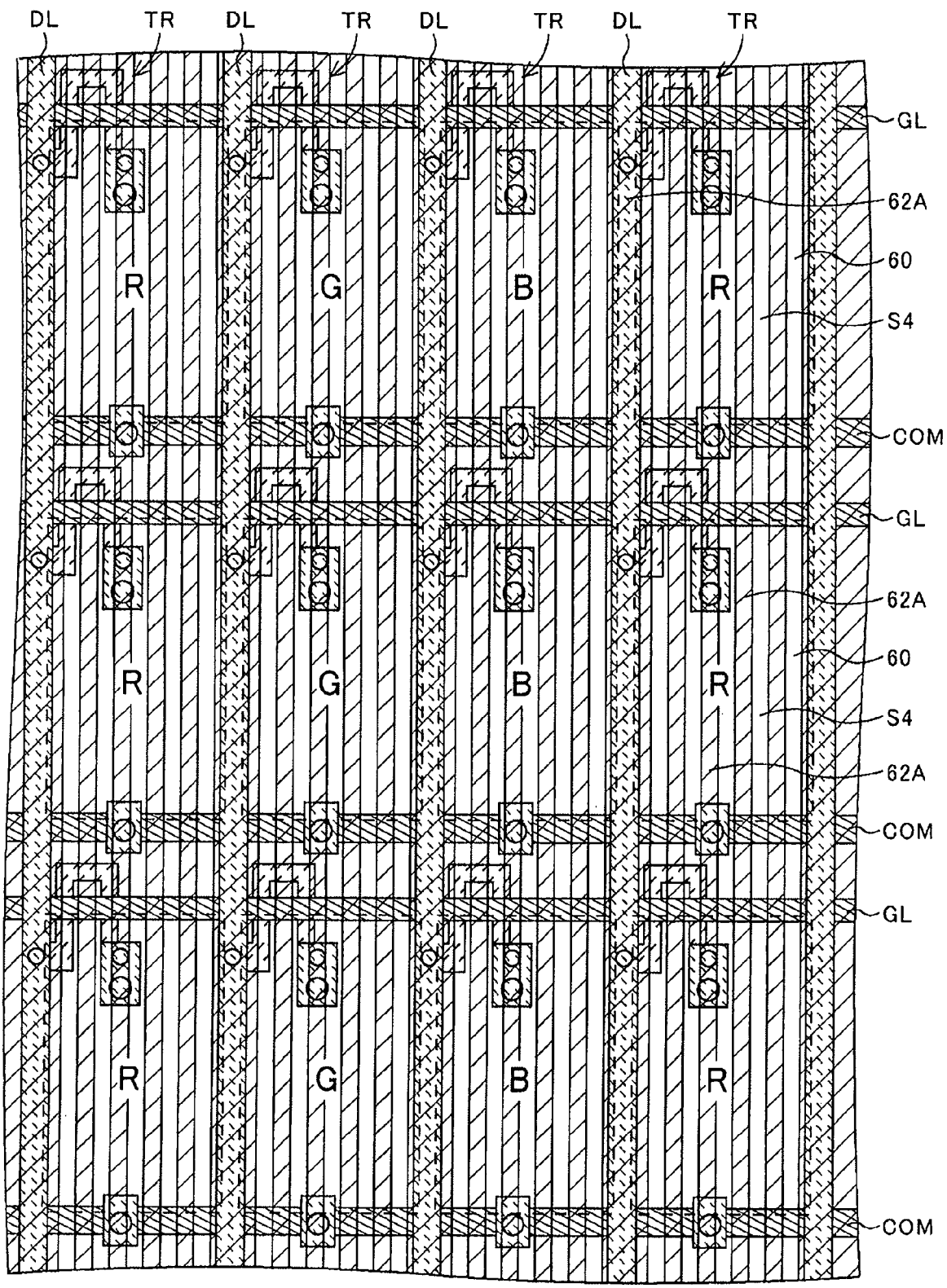
FIG. 4 shows a layout of pixels in a liquid crystal display device according to a fourth embodiment of this invention.

Next, a fourth embodiment of this invention will be described referring to FIG. 4. The same components in FIG. 4 as in FIG. 12 are denoted by the same symbols.

According to the first, second and third embodiments, the plurality of slits S1, S2 or S3 in the common electrode extends straight in the direction perpendicular to the display signal lines DL, to cross the plurality of pixels. In the fourth embodiment, however, a plurality of slits S4 in a common electrode 62A extends parallel to display signal lines DL to cross a plurality of pixels that is arrayed in the top to bottom (vertical) direction. The plurality of slits S4 is not necessarily oriented exactly parallel to the display signal lines DL. It may be oriented approximately parallel and may be tilted about 5 degrees relative to the top to bottom direction (vertical direction), for example.

Because the pixel is longer in the top to bottom direction than in the left to right direction, the number of slits can be reduced by using the vertically extending slits compared with using the horizontally extending slits. Therefore, the influence of the disclination can be reduced to improve the transmittance and the like in the fourth embodiment, compared with the embodiments using the slits S1, S2 or S3 that extend in the left to right (horizontal) direction.

On the other hand, when the slits S4 are used and a pixel electrode is made of the second layer transparent electrode such as ITO, there arises a problem of mixing of colors of neighboring pixels, which occurs when one of two horizontally neighboring pixels displays white and the other displays black and light escapes at an edge of the black-displaying pixel under the influence of an electric field of the white-displaying pixel.

In order to avoid the problem, the pixel electrode 60 is formed of the first layer transparent electrode such as ITO and the common electrode 62A is formed of the second layer transparent electrode such as ITO. Even when the slits S4 as described above are used, there exist edges of the slits S4 at borders between the pixels and there still is the problem that the transmittance is reduced by the disclination caused at the edges.

Thus, the slits S4 are configured to cross all the pixels in the top to bottom direction in a display area in this embodiment. As a result, there are no edges of the slit S4 in the pixels and the reduction in the transmittance due to the disclination is eliminated.

Next, a fifth embodiment of this invention will be described referring to FIG. 5 and FIG. 6.

Figure 5:
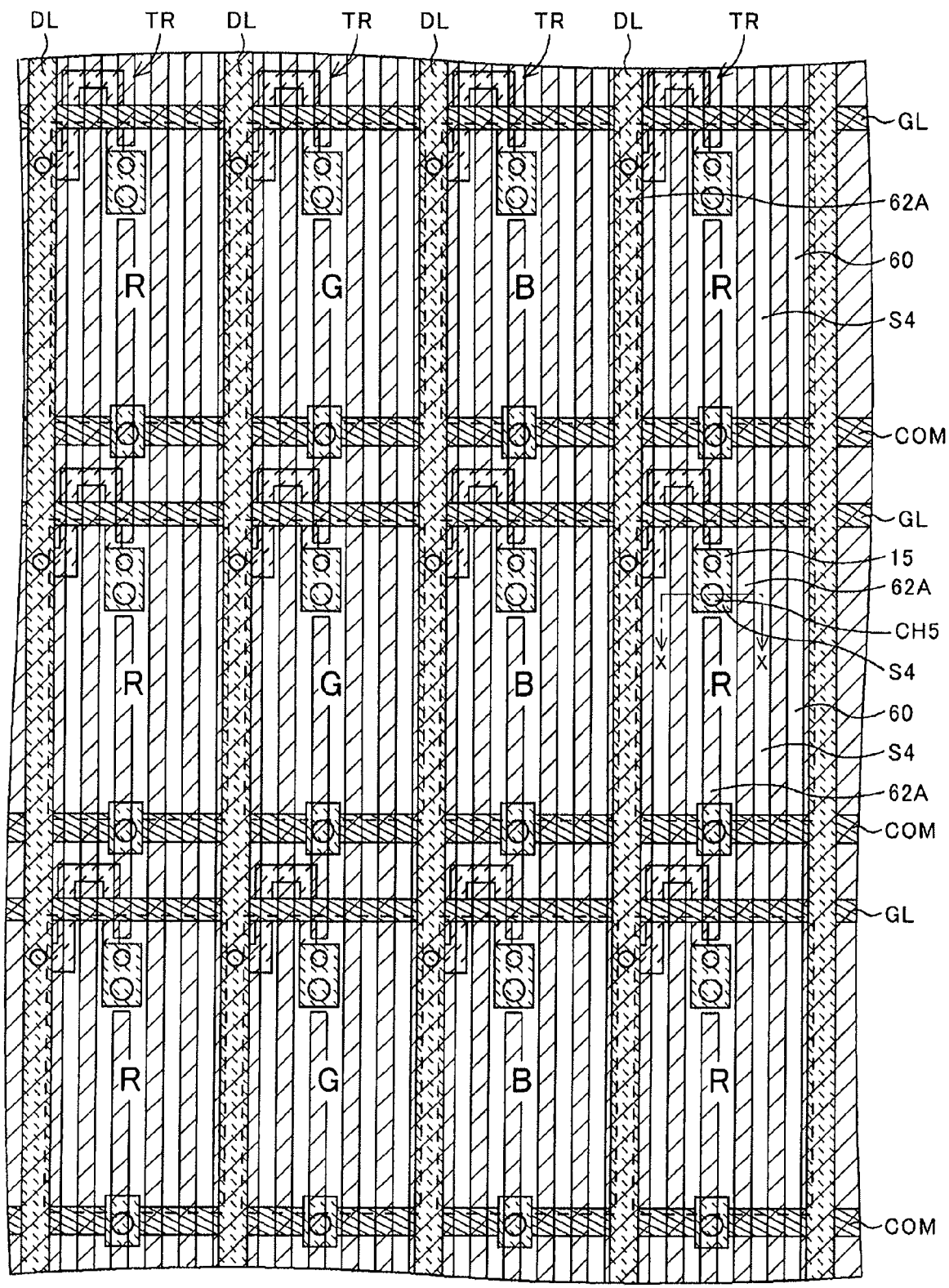
FIG. 5 shows a layout of pixels in a liquid crystal display device according to a fifth embodiment of this invention.

FIG. 5 shows a layout of pixels. FIG. 6 is a cross-sectional view showing a section X-X in FIG. 5.

Figure 6:
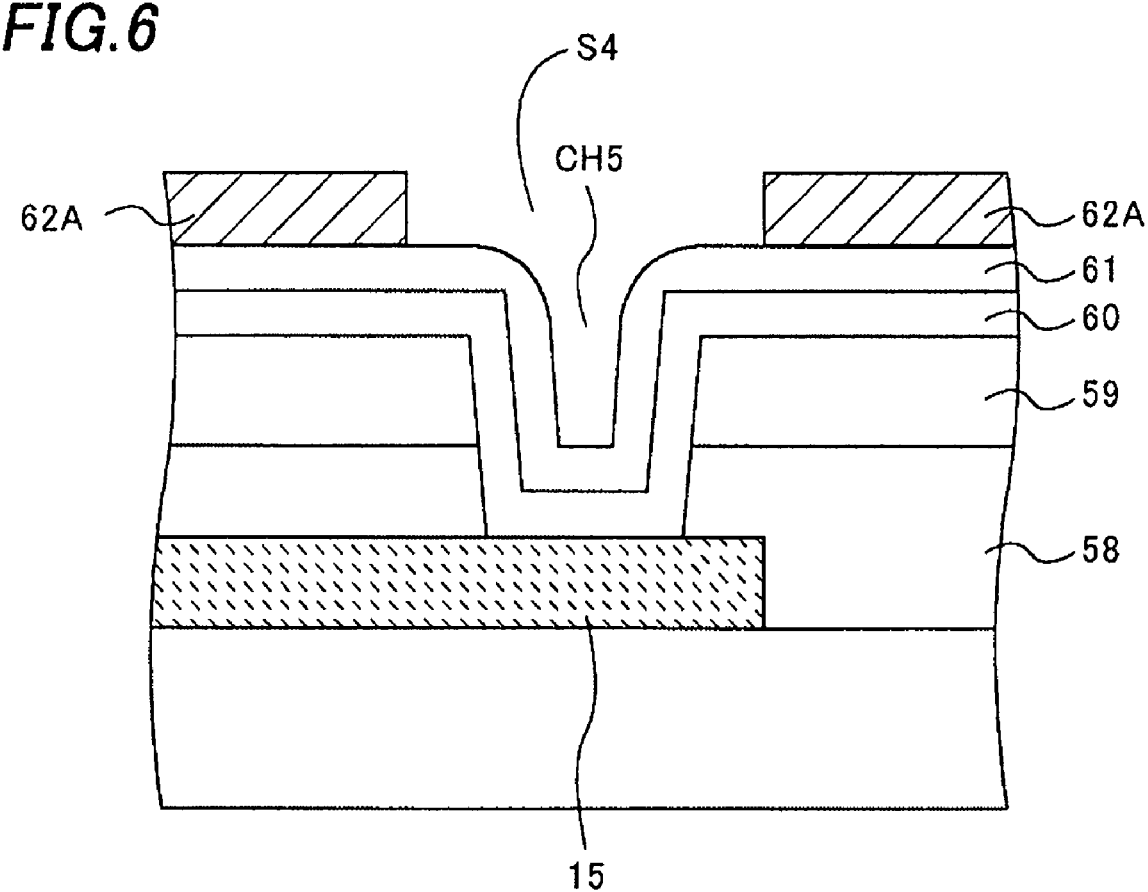
FIG. 6 is a cross-sectional view showing a section X-X in FIG. 5.
Figure 13:
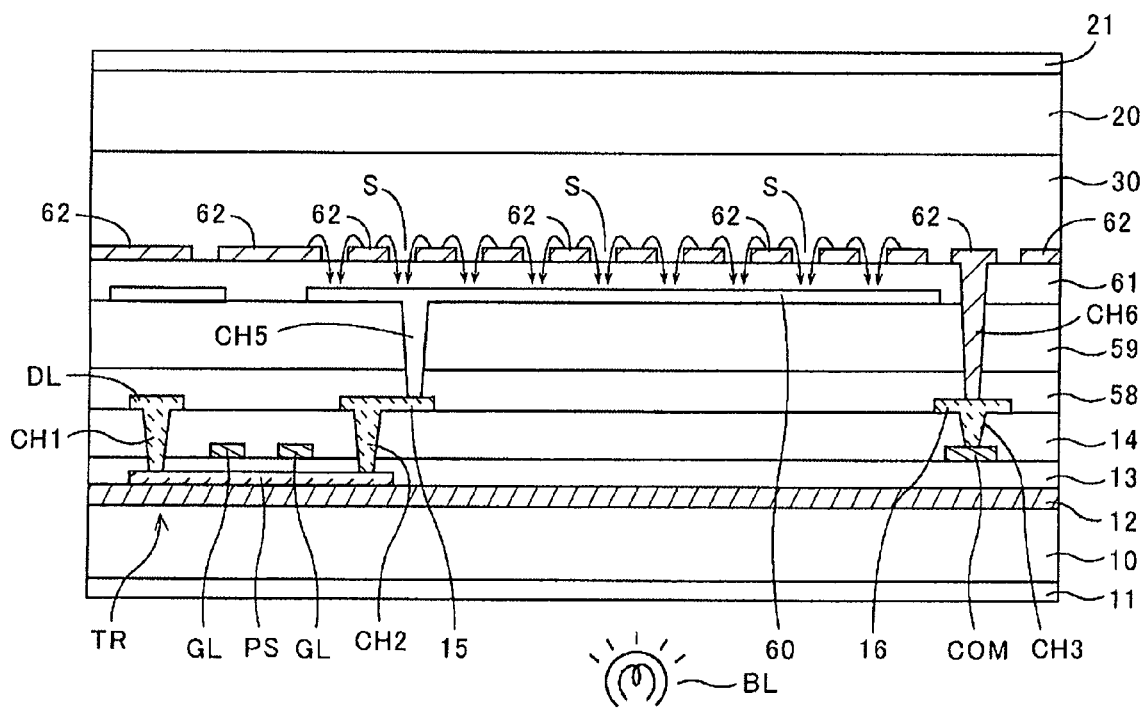
FIG. 13 is a cross-sectional view showing a section Y-Y in FIG. 12.

The same components in FIG. 5 and FIG. 6 as in FIG. 12 and FIG. 13 are denoted by the same symbols.

This embodiment differs from the fourth embodiment in that the slits S4 are formed over pixel contact portions to prevent short-circuiting between the pixel electrode 60 and the common electrode 62A.

The drain electrode 15 of the thin film transistor TR is connected with the pixel electrode 60 through the contact hole CH5 formed in the passivation film 58 and the planarization film 59, as shown in FIG. 6. The common electrode 62A is formed on the pixel electrode 60 through the insulation film 61. However, because step coverage of the insulation film 61 is exacerbated at portions of the contact holes CH5, if there is the common electrode 62A over the contact hole CH5, there is a possibility of short-circuit between the common electrode 62A and the pixel electrode 60 as the insulation film 61 might be locally thinned or lost. Thus, the slits S4 in the common electrode 62A are extended over the contact holes CH5 to prevent the short-circuiting between the common electrode 62A and the pixel electrode 60.

Figure 7:
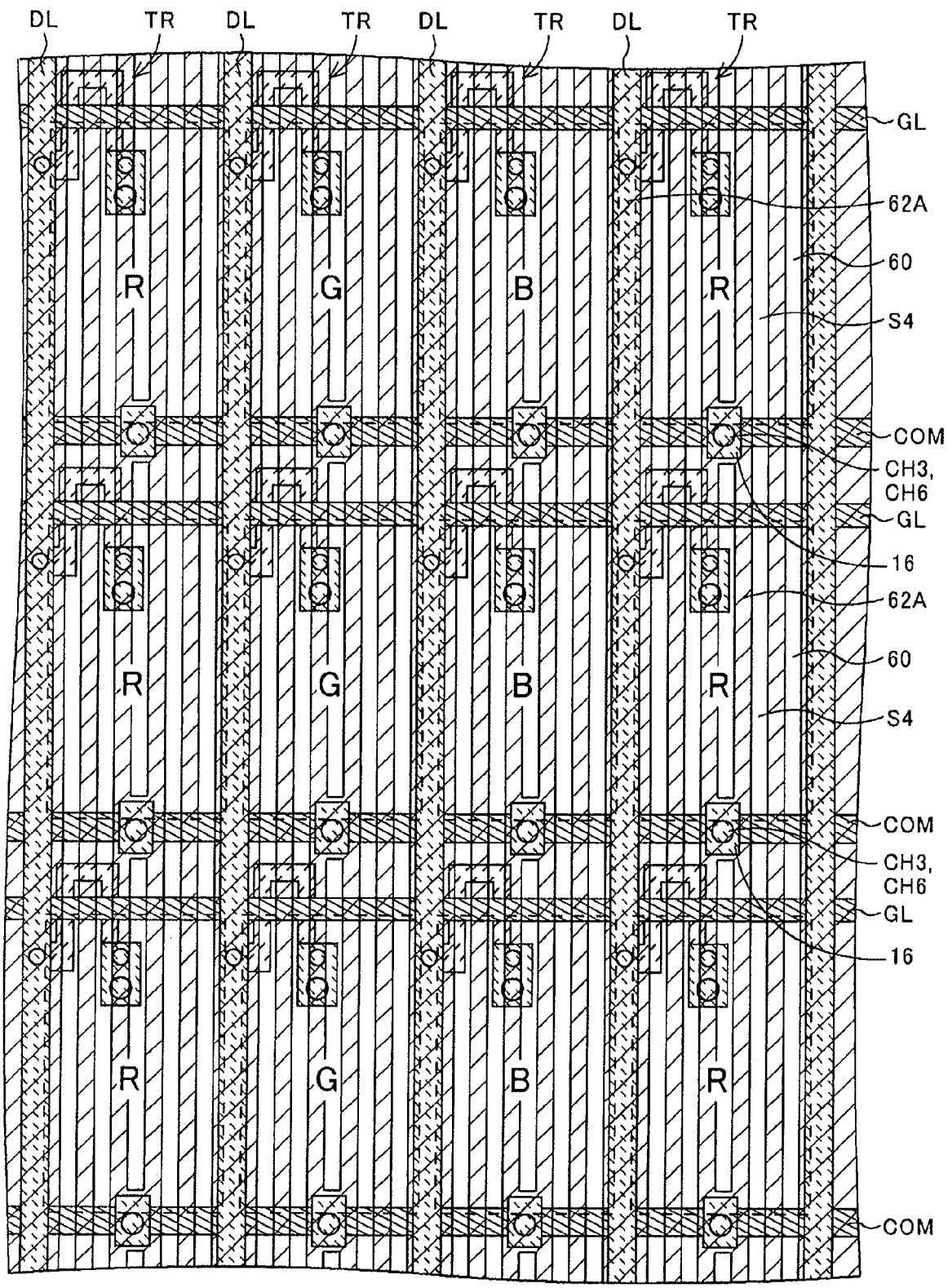
FIG. 7 shows a layout of pixels in a liquid crystal display device according to a sixth embodiment of this invention.

A sixth embodiment of this invention will be described hereafter referring to FIG. 7. The same components in FIG. 7 as in FIG. 12 are denoted by the same symbols. The common electrode 62A is connected with the pad electrode 16 through the contact hole CH6. The pad electrode 16 is connected with the common electric potential line COM through the contact hole CH3.

Therefore, if there is no common electrode 62A on the contact hole CH6, the pad electrode 16 and the common electrode 62A can not be connected with each other. Thus, it is configured in this embodiment that the slit S4 is cut, that is, the slit S4 is not formed and the common electrode 62A is left over the contact portion between the common electrode 62A and the pad electrode 16. With this, the common electrode 62A can be securely connected with the common electric potential line COM through the pad electrode 16.

Figure 8:
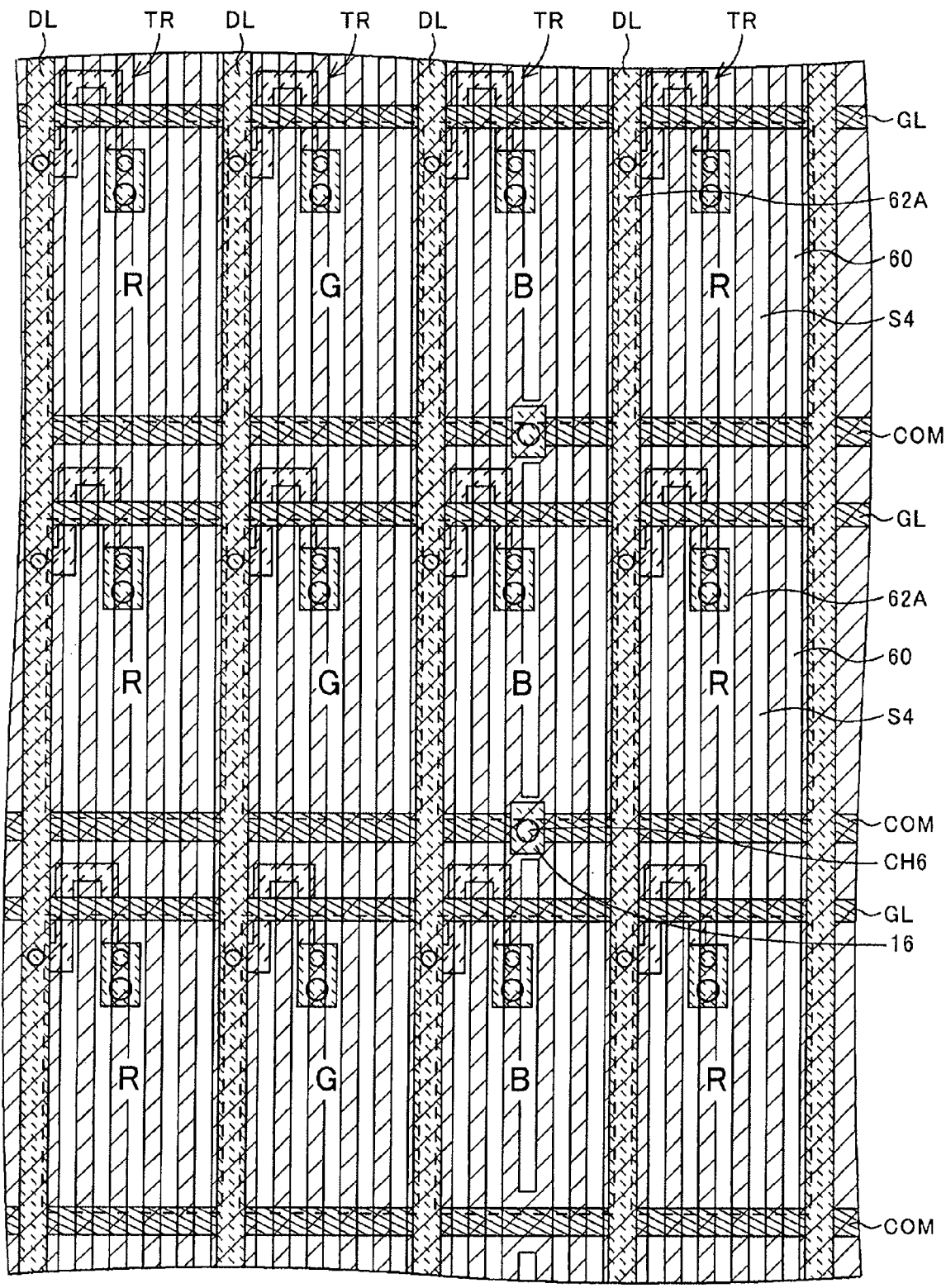
FIG. 8 shows a layout of pixels in a liquid crystal display device according to a seventh embodiment of this invention.

A seventh embodiment of this invention will be described hereafter referring to FIG. 8. The same components in FIG. 8 as in FIG. 12 are denoted by the same symbols. The contact portions between the common electrode 62A and the common electric potential line COM are formed in all of the R pixels, G pixels and B pixels in the sixth embodiment. When such contact portions are formed, however, there arises a problem that an aperture ratio of the pixel is reduced to reduce the transmittance. Thus, the contact portions between the common electrode 62A and the common electric potential line COM are formed in only one color of pixels out of the R pixels, G pixels and B pixels in this embodiment, so that the reduction in the transmittance is suppressed. It is preferable that the contact portions are formed only in the B pixels or mainly in the B pixels, since the B pixels are less sensitive to the reduction in transmittance because of their lower visibility compared with pixels of other colors. By forming the contact portions mainly in the B pixels as described above, the transmittance can be improved with the R pixels and the G pixels, and although the transmittance of the B pixels is reduced, its influence can be minimized.

Figure 9:
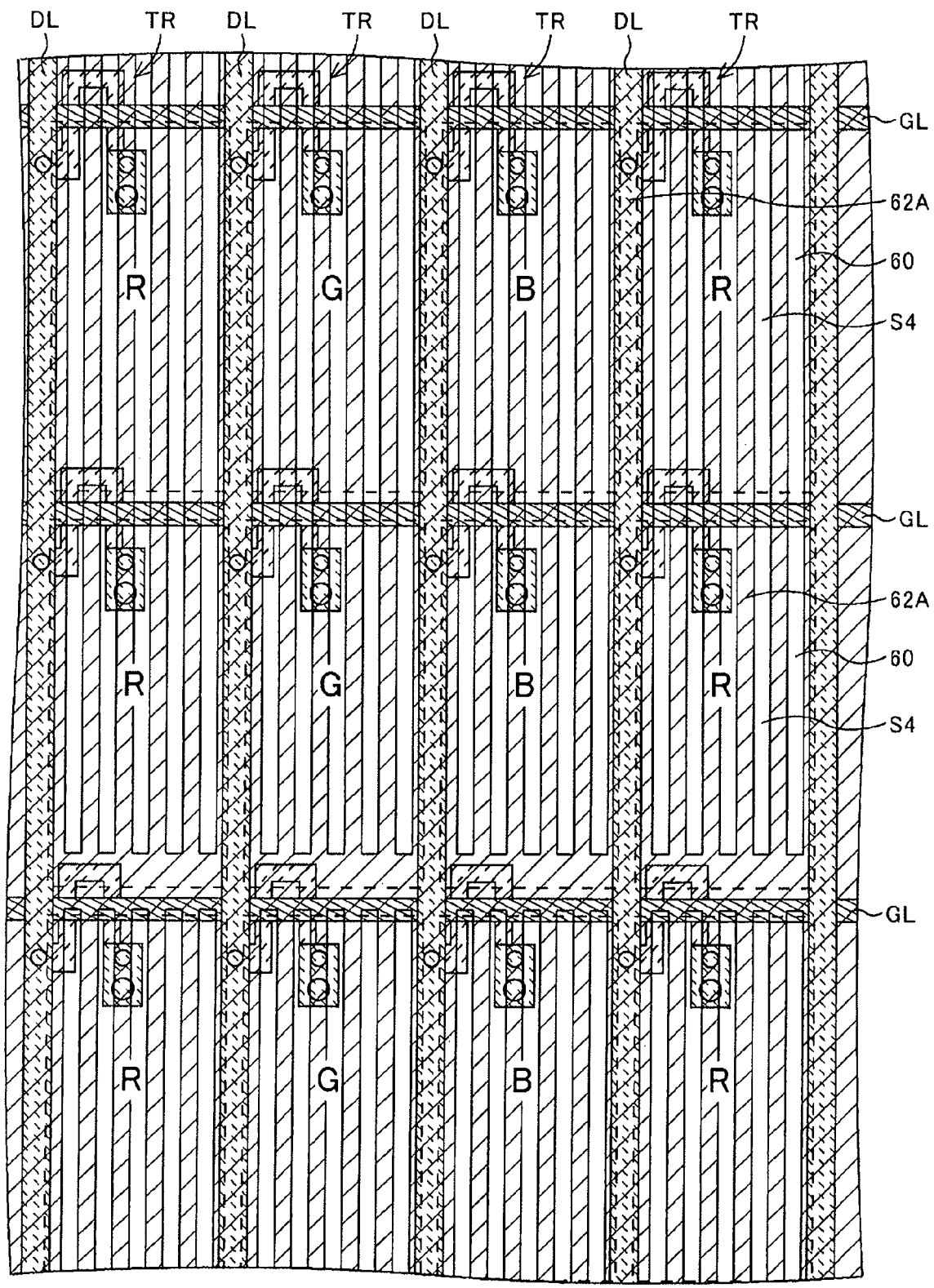
FIG. 9 shows a layout of pixels in a liquid crystal display device according to an eighth embodiment of this invention.

An eighth embodiment of this invention will be described hereafter referring to FIG. 9. The same components in FIG. 9 as in FIG. 12 are denoted by the same symbols. In this embodiment, the common electric potential line COM is removed from inside of the pixels in order to improve the aperture ratio of the pixels. Edge portions of the common electrode 62A are disposed on a periphery of the display area and connected with a peripheral common electric potential line that is provided with a common electric potential Vcom. If the slits S4 in the common electrode 62A cross all the pixels disposed in the top to bottom direction (vertical direction) of the display area, the common electrode 62A becomes long slender wirings having a high resistance, and may cause an abnormal display such as crosstalk since a relaxation time to recover from a distortion in a common electric potential signal supplied to the common electrode 62A is extended.

Thus, the slits S4 in the common electrode 62A do not cross all the pixels disposed in the top to bottom direction (vertical direction) of the display area, and the maximum number of pixels the slits S4 cross is limited to the number of the slits S4 in one pixel in this embodiment. In an example of layout shown in FIG. 9, the maximum number of pixels the slits S4 cross is 5 since the number of slits S4 in one pixel is 5. With this, the abnormal display such as crosstalk can be prevented from occurring.

Figure 10:
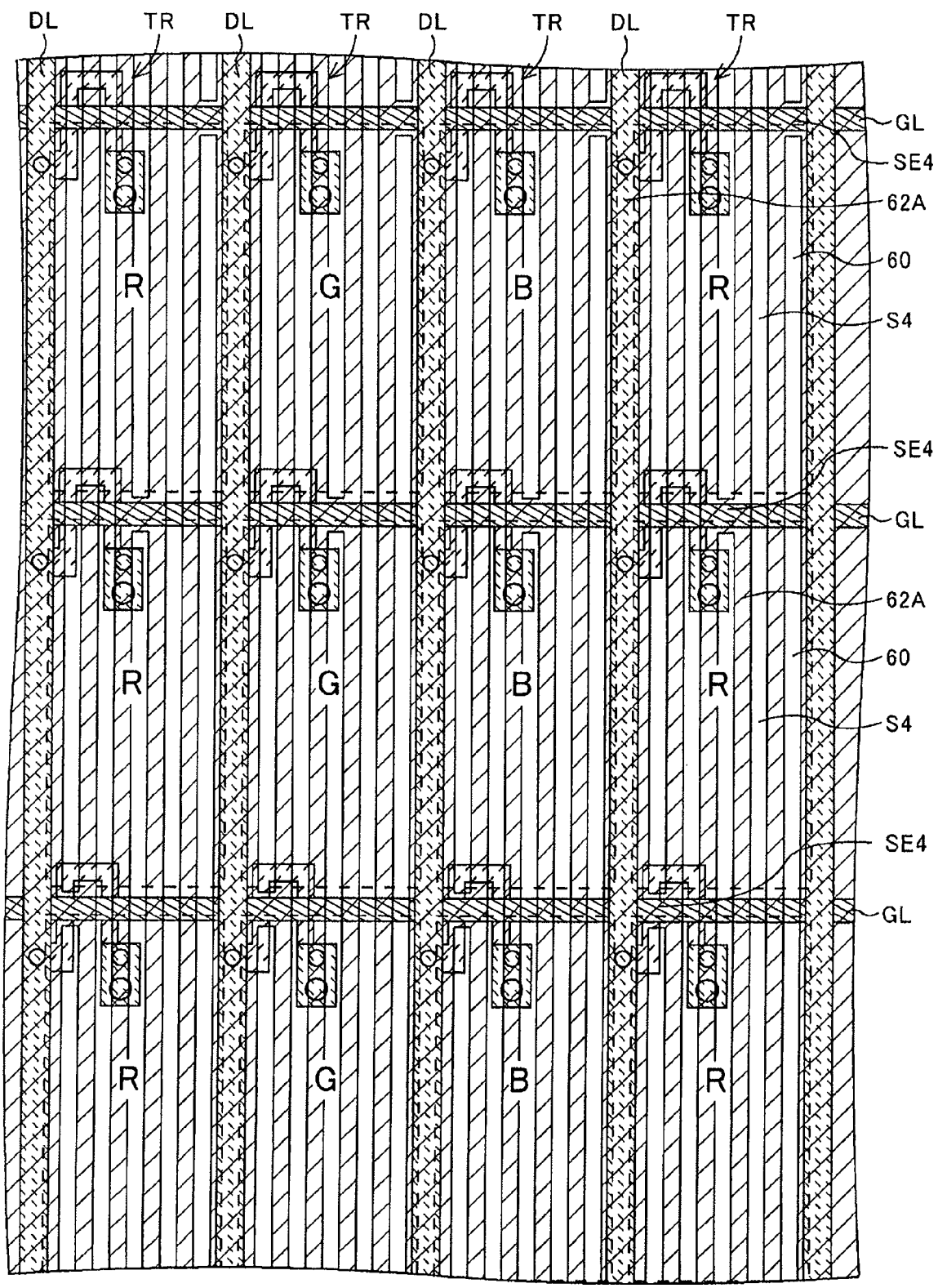
FIG. 10 shows a layout of pixels in a liquid crystal display device according to a ninth embodiment of this invention.

A ninth embodiment of this invention will be described hereafter referring to FIG. 10. The same components in FIG. 10 as in FIG. 12 are denoted by the same symbols. The slits S4 in the common electrode 62A, which cross the plurality of pixels are cut at the same border between the pixels in the eighth embodiment. In this embodiment, on the other hand, unevenness in the display is prevented from occurring by cutting the slits S4 at different borders between the pixels from each other, in other words, by forming the edges SE4 of the slits S4 at different borders between the pixels from each other. As a matter of course, this embodiment may be combined with the eighth embodiment.

Figure 11:
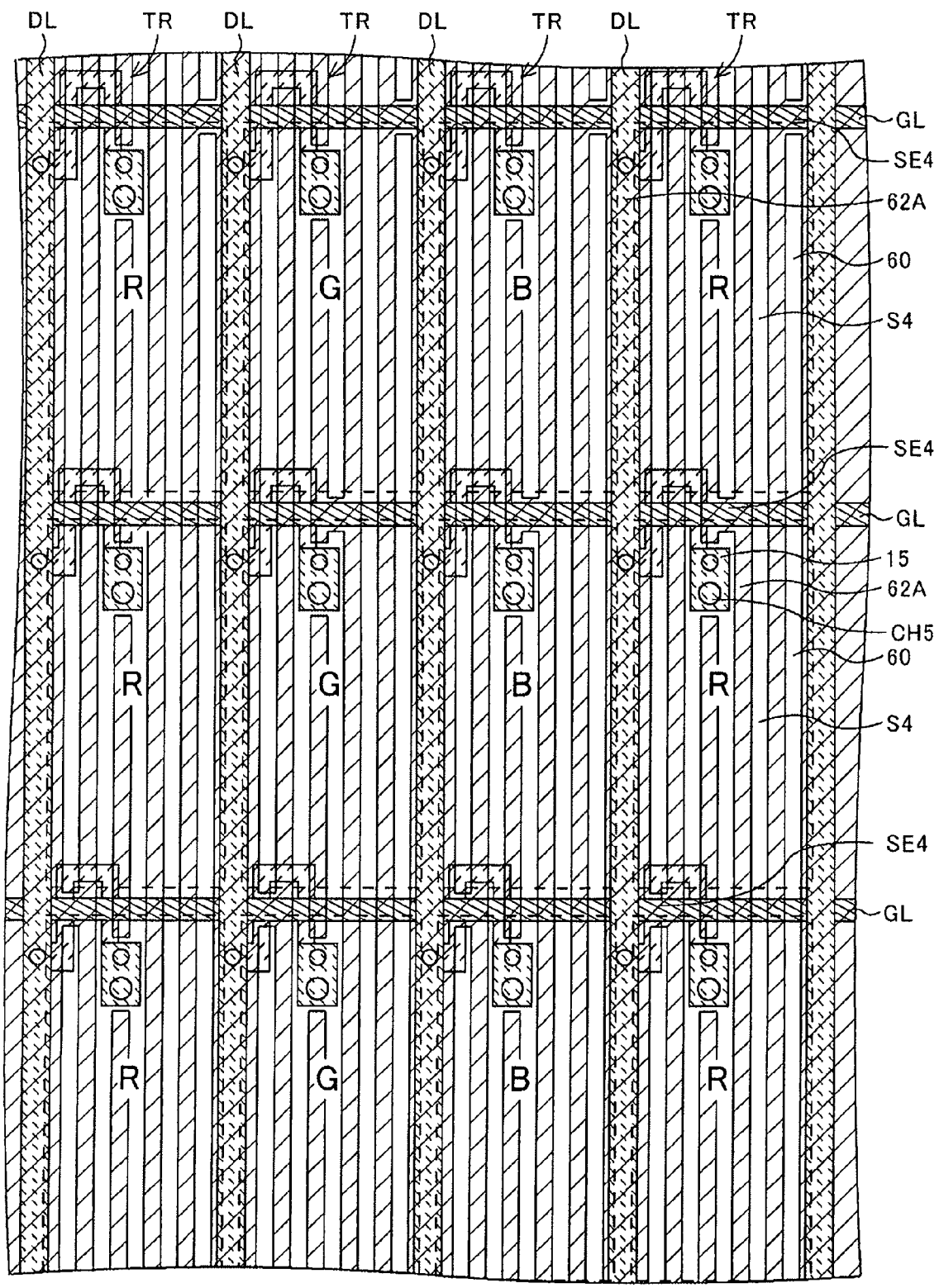
FIG. 11 shows a layout of pixels in a liquid crystal display device according to a tenth embodiment of this invention.

A tenth embodiment of this invention will be described hereafter referring to FIG. 11. The same components in FIG. 11 as in FIG. 12 are denoted by the same symbols. This embodiment is different from the ninth embodiment in that the slits S4 in the common electrode 62A are formed over the pixel contact portions (the same contact hole structure as shown in FIG. 6) to prevent the short-circuiting between the pixel electrode 60 and the common electrode 62A.

It is preferable in the eighth through tenth embodiments, in which the common electric potential line COM is removed from the inside of the pixels, that the black matrix in the left to right direction (horizontal direction) formed at the borders between the pixels are completely or partially removed. This is because light-shielding the portion of disclination with the black matrix is no longer needed, since the number of edges of the slits is reduced and the abnormal display due to the disclination is suppressed according to the embodiments of this invention.

In this case, it is preferable that the black matrix is formed at a step portion such as the pixel contact portion (contact portion between the drain electrode 15 of the thin film transistor TR and the pixel electrode 60). This is because preventing leakage of light with the black matrix is effective at the step portion since the leakage of light is caused at the pixel contact portion where there is a step that causes disturbance in alignment of the liquid crystal molecules.

A stripe array is used in the first through third embodiments as a method to array the pixels. The embodiments may also be applied to a plurality of pixels disposed in a delta array in which the pixels are arrayed to be displaced from each other. Slits in the common electrode are provided so as to cross the plurality of pixels disposed in the delta array, for example.

Although the direction in which the slits in the common electrode extend differs between the first through third embodiments and the fourth through tenth embodiments, other structural features of any embodiment can be added to the structure of any other embodiment.

Although more than one slit in the common electrode extending across the plurality of pixels are formed in the first through tenth embodiments, the slit extending across the plurality of pixels may be only one.

In the fourth through tenth embodiments, an electric field of the gate line GL exerts an influence on the liquid crystal layer through the slits S4 since the slits S4 are connected together in the top to bottom direction (vertical direction). In this case, there arises a problem of so-called burning that hurts the quality of the display. Therefore, it is preferable to have a structure in which the pixel electrode 60 above or below the gate line GL extends over to the gate line GL so that the electric field of the gate line GL can be shielded.

In the case where the slits S1, S2 or S3 are connected together in the left to right direction (horizontal direction) as in the first through third embodiments, although it is also preferable by the same reason as described above that the pixel electrode 60 at the right or the left of the display signal line DL extends over to the display signal line DL, the pixel electrode 60 may not necessarily be extended over to the display signal line DL because the display signal is reverse in polarity and approximately symmetrical to the common electric potential Vcom and has little influence on the liquid crystal layer.

According to the embodiments of this invention, the number of edges of the slits in the common electrode existing in the pixel is reduced because the slits extend across more than one pixel. Thus, the reduction in the transmittance and the contrast due to the disclination can be suppressed.

What is claimed is:

1. A liquid crystal display device comprising:
a plurality of pixels, each of the pixels comprising a thin film transistor and a pixel electrode connected with the thin film transistor; and
a common electrode disposed on the pixel electrodes and provided with a common electric potential; and
a slit formed in the common electrode so as to cover more than one pixel,
wherein the pixels comprise a plurality of red pixels, a plurality of green pixels and a plurality of blue pixels, a picture element comprises a red pixel, a green pixel and a blue pixel, and the slit extends through a picture element so that an edge of the slit is located at a border between two picture elements, and wherein no green pixels are bordered by an edge of a slit.

2. The liquid crystal display device of claim 1, wherein the green pixel is disposed between the red pixel and the blue pixel in the picture element.

* * * * *